(12) United States Patent
Kang (10) Patent No.: US 7,853,642 B2
(45) Date of Patent: Dec. 14, 2010

(54) NETWORK SYSTEM AND CONTROL METHOD FOR RECOGNIZING VARIABLE IP ADDRESS AS FIXED IP ADDRESS

(75) Inventor: Sung-Ho Kang, Uiwang (KR)

(73) Assignee: Samsung Techwin Co., Ltd., Changwon-City (KR)

( * ) Notice: Subject to any disclaimer, the term of this patent is extended or adjusted under 35 U.S.C. 154(b) by 2075 days.

(21) Appl. No.: 09/912,575

(22) Filed: Jul. 26, 2001

(65) Prior Publication Data
US 2002/0091791 A1  Jul. 11, 2002

(30) Foreign Application Priority Data
Nov. 20, 2000  (KR) ................ 2000-69102

(51) Int. Cl.
*G06F 15/16* (2006.01)
(52) U.S. Cl. ..................... 709/203; 709/217
(58) Field of Classification Search ........... 709/217, 709/218, 219, 227, 245
See application file for complete search history.

(56) References Cited

U.S. PATENT DOCUMENTS

| 6,012,088 A | 1/2000 | Li et al. | |
| 6,014,660 A * | 1/2000 | Lim et al. ............... | 707/3 |
| 6,052,725 A | 4/2000 | McCann et al. | |
| 6,128,664 A | 10/2000 | Yanagidate et al. | |
| 6,247,055 B1 * | 6/2001 | Cotner et al. ............ | 709/227 |
| 6,353,848 B1 * | 3/2002 | Morris .................... | 709/203 |
| 6,452,925 B1 * | 9/2002 | Sistanizadeh et al. .... | 370/352 |
| 6,567,122 B1 * | 5/2003 | Anderson et al. ........ | 709/217 |
| 6,671,727 B1 * | 12/2003 | Odenwald ............... | 709/227 |
| 2003/0208472 A1 * | 11/2003 | Pham ...................... | 709/203 |

FOREIGN PATENT DOCUMENTS

| KR | 12264/2000 | 3/2000 |
| KR | 41829/2000 | 7/2000 |

OTHER PUBLICATIONS

R. Droms, "RFC 2131", Mar. 1997.*
"DHCP (Dynamic Host Control Protocol)", Sep. 2000, Network World, Lighting you load with DHCP.*
"What is DHCP?"—A word definition From the Webopedia Computer Dictionary, Last modified Sep. 2003.*
"Understanding DNS: How to Register for, Configure, and Change DNS Service", Sep. 2000, White Pape, pp. 1-6.*

* cited by examiner

*Primary Examiner*—Hassan Phillips
(74) *Attorney, Agent, or Firm*—Sughrue Mion, PLLC (57) ABSTRACT

A network system comprises at least one network unit having a variable Internet protocol (IP) address and unique identification information, and an agent server including a database for receiving and storing the variable IP address and unique identification information from each network unit, and a control unit for receiving, from a user, unique identification information of a network unit selected by the user, for searching the database for the variable IP address of the network unit selected by the user on the basis of the received unique identification information, and for enabling the user to gain access to the selected network unit in accordance with the search results. As a result, the variable IP address of the given network unit can be recognized as a fixed IP address, and can be used by the user to access the selected network unit. A method of controlling the network system comprises steps corresponding to the functions just listed.

17 Claims, 5 Drawing Sheets

NETWORK SYSTEM AND CONTROL METHOD FOR RECOGNIZING VARIABLE IP ADDRESS AS FIXED IP ADDRESS

CLAIM OF PRIORITY

This application makes reference to, incorporates the same herein, and claims all benefits accruing under 35 U.S.C. §119 from my application NETWORK SYSTEM AND CONTROLLING METHOD THEREOF filed with the Korean Industrial Property Office on 20 Nov. 2000 and there duly assigned Serial No. 69102/2000.

BACKGROUND OF THE INVENTION

1. Technical Field

The present invention relates to a network system and a method of controlling the same. More particularly, the invention relates to a network system, and a method of controlling the same, wherein variable Internet protocol (IP) addresses of network units are viewed as fixed IP addresses.

2. Related Art

All network units (for example, host computers, routers, set-top boxes, etc.) connected to the Internet generally have unique transmission control protocol/Internet protocol (TCP/IP) addresses which enable the corresponding network units to access other network units located in all parts of the world so as to utilize Internet services.

The TCP/IP is an aggregate of two protocols, a transmission control protocol and an Internet protocol, and supports the exchange of data between different network units. Software modules employing the TCP/IP are required for the connection of network units to the Internet. These software modules may be, for example, Internet Explorer, Netscape, etc. The TCP/IP is currently adopted as a standard protocol of the Internet, and its address, or IP address, is typically composed of four parts, each being a numeral (for example, 211.203.81.245), for identifying a corresponding communication network or network unit. Different Internet IP addresses are assigned to network units connected to the Internet throughout the world, and are managed by a network information center (NIC).

Such IP addresses of network units may generally be classified into two types: a fixed IP address and a variable IP address. The fixed IP address, owing to its unchangeability, is preferred to enable a user to access a corresponding network unit by entering it at any place, but it is disadvantageous in that an operator of the network unit has to pay an IP company a high rate for using it.

As compared with the fixed IP address, the variable IP address is assigned by a dynamic host configuration protocol (DHCP) server in such a manner that it is permitted to be used only for a predetermined period of time. In this regard, a network unit employing such a variable IP address must be again assigned a valid IP address from the DHCP server after the predetermined period of time elapses. This variable IP address is disadvantageous in that it is variable, but it has the advantage that an operator of the network unit can utilize the Internet at a lower rate as compared to the higher rate of the fixed IP address.

If a network unit employs a variable IP address, a user will have to recognize the variable IP address to gain access to the network unit. However, the user has no way of recognizing the variable IP address because the DHCP server selects any one of numerous valid IP addresses held therein randomly as the variable IP address, and then assigns it to the network unit. As a result, the user cannot access the network unit because he or she cannot recognize the variable IP address. Consequently, an operator of the network unit is obliged to employ the high-cost fixed IP address.

The following are considered to be generally relevant to the present invention but are burdened by the disadvantages set forth above: Korean Patent Publication No. 12264/2000 to Byung-Jin Lim, entitled SERVER CONNECTING METHOD AND SYSTEM FOR DYNAMIC IP ADDRESS, published on Mar. 6, 2000, Korean Patent Publication No. 41829/2000 to Sun-Hui Kim et al., entitled PRIVATE IP ADDRESS OPERATING APPARATUS IN MULTI-MEDIA SATELLITE TELECOMMUNICATION SYSTEM, published on Jul. 15, 2000, U.S. Pat. No. 6,012,088 to Li et al., entitled AUTOMATIC CONFIGURATION FOR INTERNET ACCESS DEVICE, issued on Jan. 4, 2000, U.S. Pat. No. 6,052,725 to McCann et al., entitled NON-LOCAL DYNAMIC INTERNET PROTOCOL ADDRESSING SYSTEM AND METHOD, issued on Apr. 18, 2000, and U.S. Pat. No. 6,128,664 to Yanagidate et al., entitled ADDRESS-TRANSLATING CONNECTION DEVICE, issued on Oct. 3, 2000.

SUMMARY OF THE INVENTION

The present invention has been developed in view of the above problems, and it is an object of the present invention to provide a network system, and a method of controlling the same, wherein variable IP addresses of network units are recognized as fixed IP addresses.

In accordance with one aspect of the present invention, the above and other objects can be accomplished by the provision of a network system comprising: at least one network unit having a variable Internet protocol (IP) address and unique identification information; and an agent server, including a database for receiving and storing the variable IP address and unique identification information from the network unit, and a control unit for receiving the unique identification information of the network unit from a user over a network, for searching the database for the variable IP address of the network unit on the basis of the received unique identification information, and for enabling the user to gain access to the network unit in accordance with the searched result.

Preferably, the agent server further includes a communication unit for receiving the unique identification information and variable IP address from the network unit, and for transferring them to the database.

Preferably, the unique identification information may include at least one of an Ethernet address of the network unit, an identifier of the network unit, and a search keyword for the variable IP address of the network unit.

More preferably, the control unit receives at least one of the Ethernet address, the identifier and the search keyword from the user over the network, compares it with data stored in the database, and searches for the variable IP address if the comparison produces a match. The data stored in the database may be updated at regular time intervals.

In accordance with another aspect of the present invention, there is provided a method of controlling a network system having an agent server and at least one network unit, the method comprising the steps of: (a) storing unique identification information and a variable IP address of the network unit in a database in the agent server; (b) receiving the unique identification information of the network unit from a user over a network, comparing it with the unique identification information stored in the database, and searching for the variable IP address of the network unit if the comparison produces a match; and (c) connecting the user to the network unit having the searched variable IP address.

Preferably, the method further comprises the step of receiving the unique identification information and variable IP address of the network unit, and transferring them to the database in the agent server.

Preferably, the unique identification information includes at least one of an Ethernet address of the network unit, an identifier of the network unit, and a search keyword for the variable IP address of the network unit.

More preferably, the above step (b) includes the step of receiving at least one of the Ethernet address, the identifier and the search keyword from the user over the network, comparing it with data stored in the database, and searching for the variable IP address if the comparison produces a match. The data stored in the database may be updated at regular time intervals.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, and wherein.

DETAILED DESCRIPTION OF THE PREFERRED EMBODIMENTS

Figure 1:
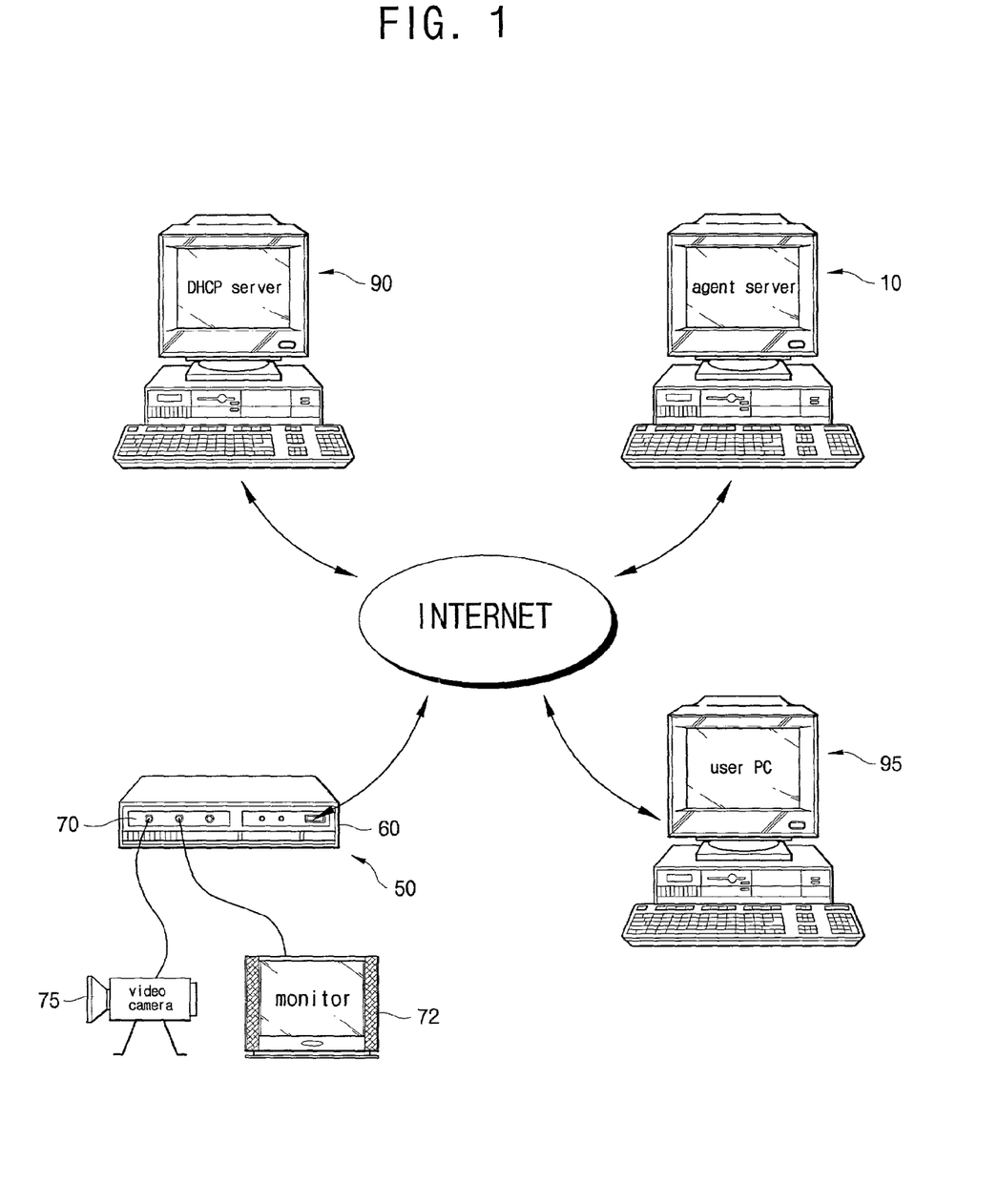
FIG. 1 is a view schematically showing the construction of a network system in accordance with the present invention.
Figure 2:
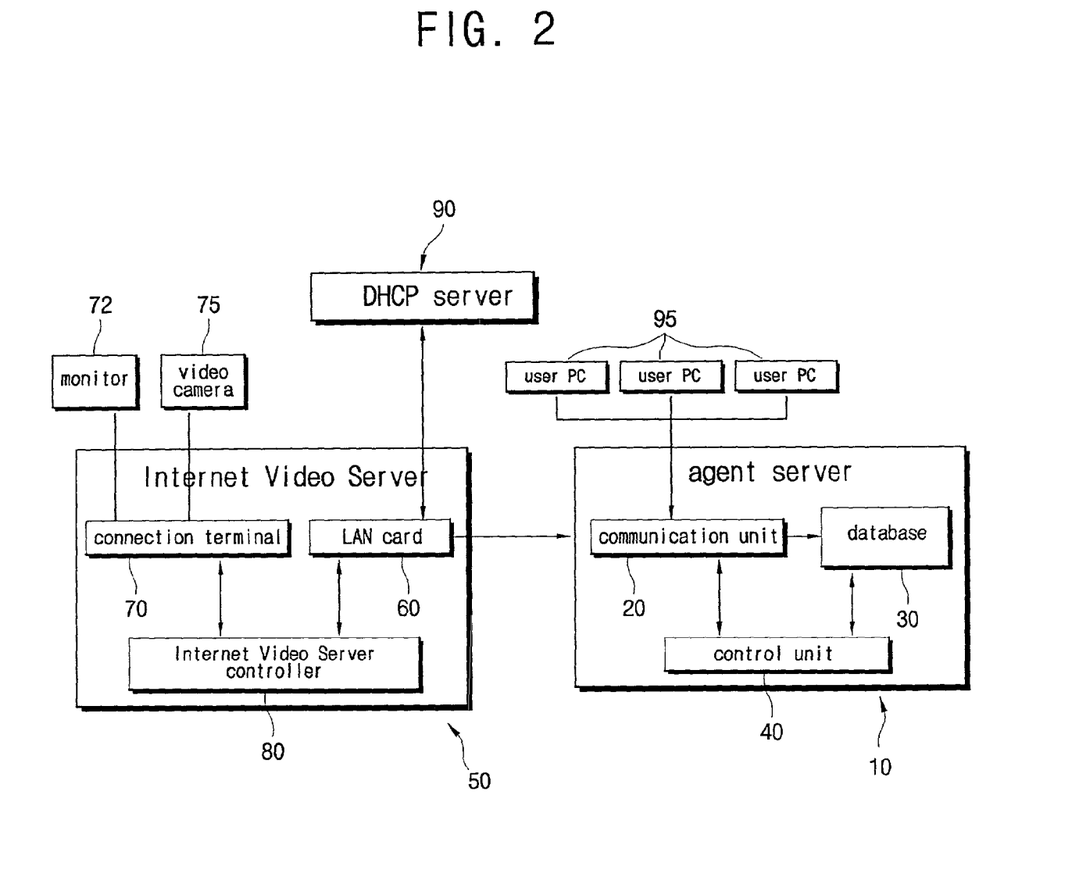
FIG. 2 is a block diagram showing in detail the construction of the network system in accordance with the present invention.

FIG. 1 is a view schematically showing the construction of a network system in accordance with the present invention, and FIG. 2 is a block diagram showing in detail the construction of the network system in accordance with the present invention. As shown in these drawings, the present network system comprises: an Internet video server 50, which is a network unit employing a variable IP address, and which is equipped with a local area network (LAN) card 60; and an agent server 10, including a database 30 for storing the variable IP address of the Internet video server 50 and a unique number, or an Ethernet address, of the LAN card 60 of the server 50. The agent server 10 further includes a control unit 40 for searching the database 30 for the variable IP address of the Internet video server 50 on the basis of the Ethernet address of the server 50 entered through a user personal computer (PC) 95, and for connecting the user PC 95 to the server 50 having the searched variable IP address.

It should be noted that the Internet video server 50 is taken as an example of the network unit for the convenience of description, and the network unit may be a host computer, a router or other Internet accessible unit equipped with the LAN card 60, in addition to the Internet video server 50.

The Internet video server 50 is, preferably, a video compression transmission unit with a Web server and TCP/IP. A user can gain access to the server 50 using a Web browser of his or her own PC at a remote site.

The server 50 is assigned a variable IP address from a dynamic host configuration protocol (DHCP) server 90. The LAN card 60 has a unique 48-bit Ethernet address, as is typically assigned to every network unit. The 24 bits in the latter half of the 48 bits of the Ethernet address are stored in the database 30 of the agent server 10, as will be described later in detail, such that they are used to identify a corresponding network unit.

The Internet video server 50 has a connection terminal 70 for a video camera 75 or monitor 72. The server 50 can output a video signal to the monitor 72 through the connection terminal 70 or can receive a video signal from the video camera 75 through the connection terminal 70, and can compress the received video signal and transmit the compressed video signal over the Internet.

The server 50 further includes an Internet video server controller 80 for processing a service request from a Web browser, and for transferring the latter-half 24 bits of the Ethernet address and the variable IP address of the server 50 to the database 30 of the agent server 10, as will be described later in detail.

The agent server 10 includes a communication unit 20 for receiving the Ethernet address and variable IP address transferred from the Internet video server 50. The database 30 is provided in the agent server 10 to store the Ethernet address and the variable IP address of the Internet video server 50 received through the communication unit 20. The control unit 40 is provided in the agent server 10 to search the database 30 for the variable IP address of the Internet video server 50 on the basis of the Ethernet address of the server 50 entered through a user PC 95, and to connect the user PC 95 to the server 50 having the searched variable IP address.

The communication unit 20 preferably includes a receiver (not shown) for receiving the Ethernet address and the variable IP address of the Internet video server 50, and a transmitter (not shown) for transmitting the results of the search conducted by the control unit 40 to the user PC 95. With this construction, the communication unit 20 acts to transfer the Ethernet address and the variable IP address from the Internet video server 50 to the database 30.

The database 30 acts to store the Ethernet address assigned to the network unit (that is, the LAN card 60 of the Internet video server 50, the variable IP address assigned from the DHCP server 90 to the server 50) and an identifier corresponding one-to-one to the Ethernet address. When the Internet video server 50 is powered on, then the variable IP address, the Ethernet address and the identifier are transferred from the Internet video server controller 80 to the communication unit 20, and are in turn stored in the database 30. The data stored in the database 30 is updated at regular time intervals.

The database 30 is further adapted to store keywords for a keyword search operation. When a user selects a desired keyword, the keyword search operation is performed on the basis of the selected keyword to connect the user to a network unit associated with that keyword according to the searched result even though the user does not recognize an Ethernet address and identifier of the network unit.

The Ethernet address of the Internet video server 50 is generally expressed in hexadecimal 48 bits as in Table 1 below, and only the latter-half 24 bits thereof are stored in the database 30 in the present embodiment. Also, the variable IP address of the Internet video server 50 is typically composed of four parts, each being a numeral. For example, the variable IP address and the Ethernet address may be expressed as 211.144.88.99 and 0000f0ffa101, respectively.

In this case, the variable IP address, the Ethernet address and the identifier of the Internet video server 50 may be stored in the database 30 as in the following Table 1.

TABLE 1

| DATABASE | VARIABLE IP ADDRESS | ETHERNET ADDRESS | IDENTIFIER |
|---|---|---|---|
| 1 | 211.144.88.95 | Ffa101 | camera1 |
| 2 | 211.144.88.96 | ffa102 | camera2 |
| 3 | 211.144.88.97 | ffa103 | camera3 |
| 4 | 211.144.88.98 | ffa104 | camera4 |

As stated previously, the control unit 40 is provided in the agent server 10 to search the database 30 for the variable IP address of the Internet video server 50 on the basis of the Ethernet address of the server 50 entered through a user PC 95, and to connect the user PC 95 to the server 50 having the searched variable IP address.

A description will hereinafter be given of a method of operating the network system with the above-described construction in accordance with the present invention with reference to FIGS. 3 and 4 and the Table 1 above.

Figure 3:
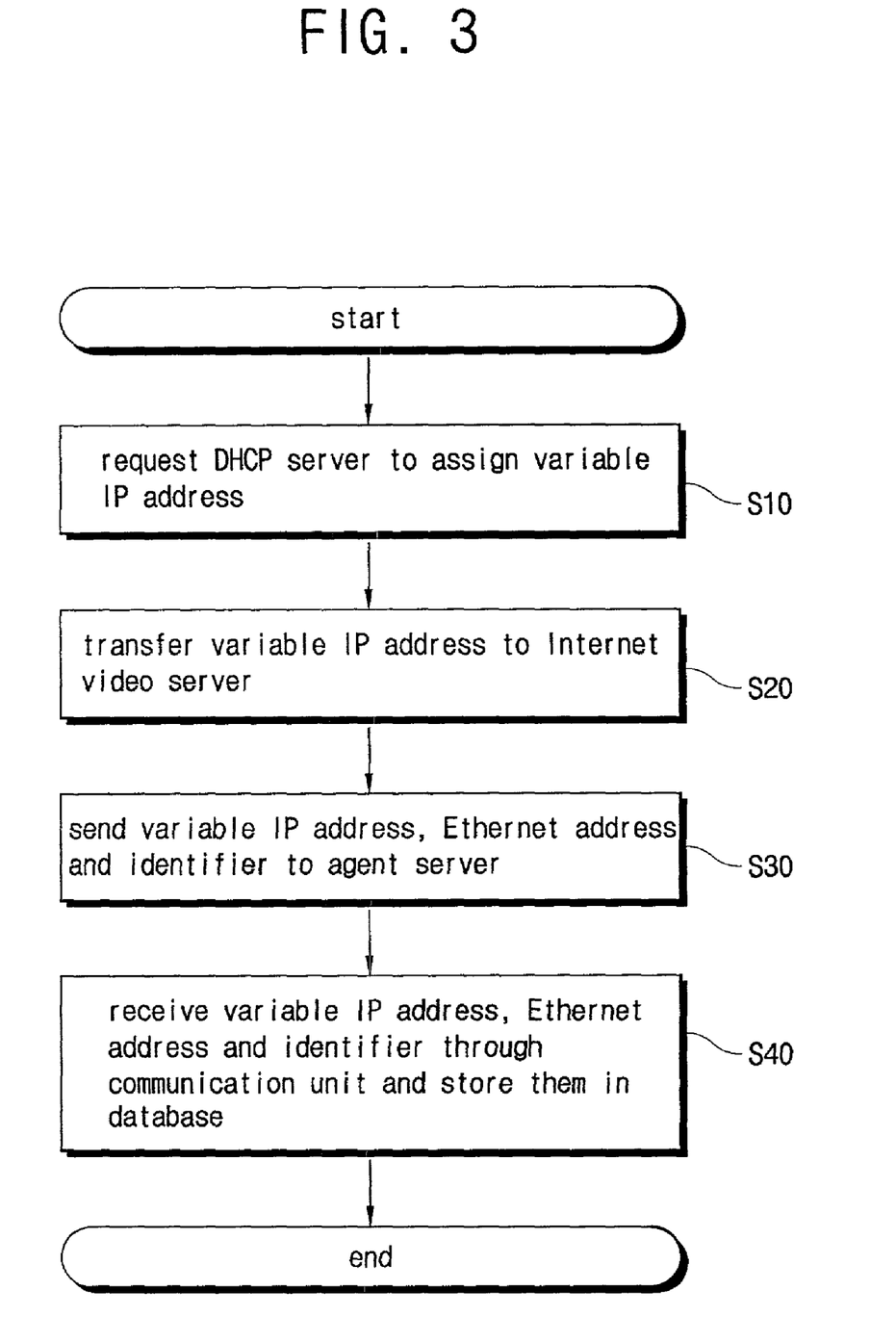
FIG. 3 is a flowchart illustrating a procedure for storing information of a network unit in an agent server in accordance with the present invention.

FIG. 3 is a flowchart illustrating a procedure for storing information of the Internet video server 50 in the agent server 10 in accordance with the present invention. First, when the Internet video server 50 is powered on, it requests the nearest DHCP server 90, using a DHCP protocol, to assign a variable IP address thereto (S10). In response to the variable IP address assignment request from the Internet video server 50, the DHCP server 90 selects any one of numerous valid variable IP addresses in its variable IP address pool, and transfers the selected variable IP address to the server 50 (S20). Then, the Internet video server 50 receives the variable IP address (211.144.88.95) from the DHCP server 90, and employs it for a predetermined period of time.

Thereafter, the Internet video server controller 80 in the server 50 sends an Ethernet address (ffa101) assigned to the LAN card 60 in the server 50, the variable IP address (211.144.88.95) assigned by the DHCP server 90, and a self-identifier (camera1) of the server 50 to the communication unit 20 in the agent server 10 via the LAN card 60 (S30). Upon receiving the variable IP address, the Ethernet address and the identifier from the Internet video server controller 80, the communication unit 20 stores them in the database 30 in the agent server 10 (S40).

Figure 4:
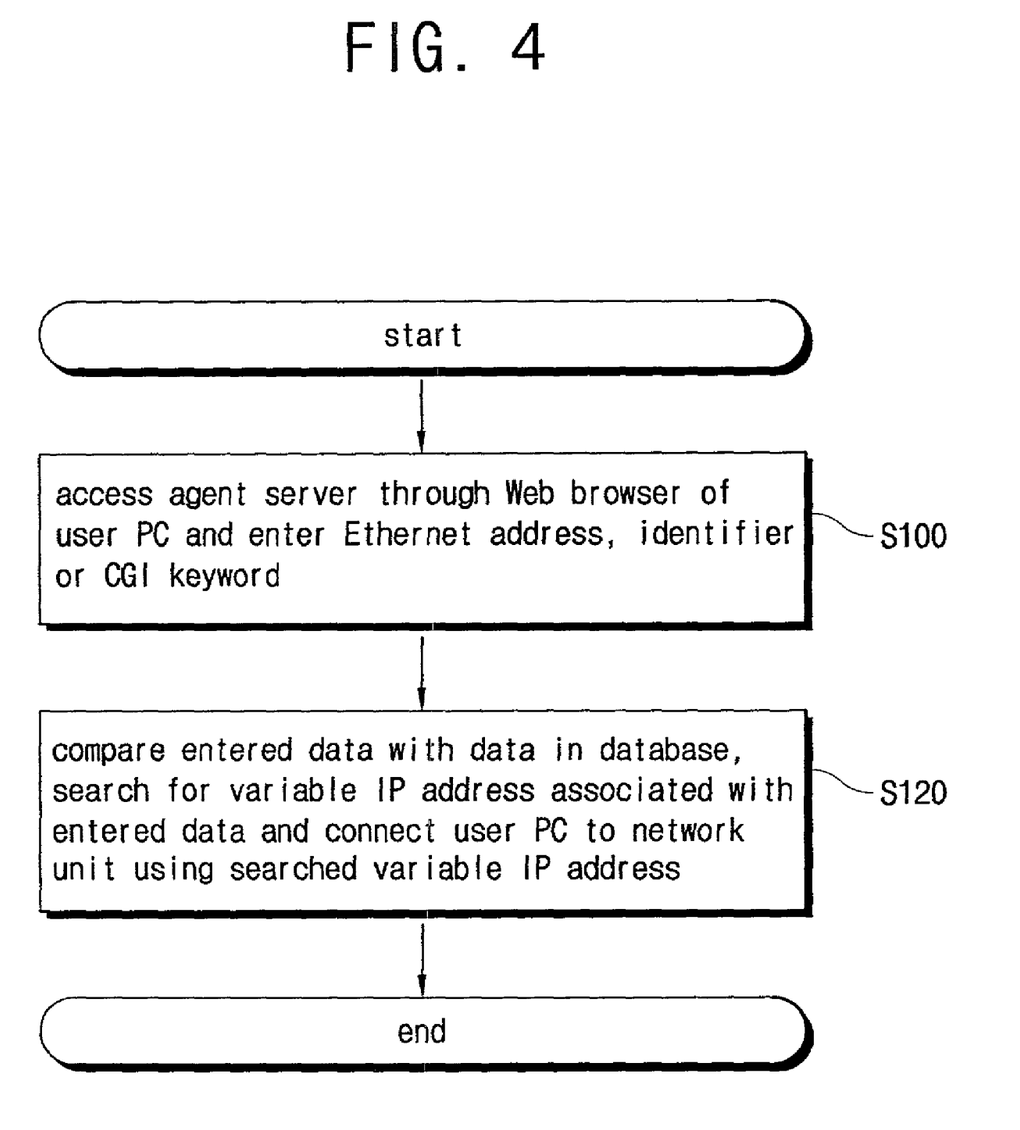
FIG. 4 is a flowchart illustrating a procedure for connecting a user to the network unit in accordance with the present invention.

FIG. 4 is a flowchart illustrating a procedure of connecting a user PC 95 to the Internet video server 50 employing the variable IP address in accordance with the present invention. First, the user gains access to the agent server 10 through a Web browser of the user PC 95, and sequentially enters an IP address or uniform resource locator (URL) address of the agent server 10, and the latter-half 24 bits of an Ethernet address assigned to the server 50 or a self-identifier of the server 50, corresponding to the Ethernet address (S100).

Example: http://IP_server/camera.cgi? ffa101

Thereafter, the control unit 40 in the agent server 10 runs a camera.cgi program therein to compare the data entered by the user with data stored in the database 30, searches the database 30 for a variable IP address (211.144.88.95) associated with the entered data if the comparison is a match, and connects the user PC 95 to the network unit or server 50 using the searched variable IP address (S120). The camera.cgi program is a type of common gateway interface program, and is run in the agent server 10 to input the data ffa101 following the "?" in the "camera.cgi? ffa101" portion of the data (http://IP_server/camera.cgi? ffa101) entered through the Web browser by the user and to search the database 30 for a variable IP address associated with the inputted data.

Figure 5:
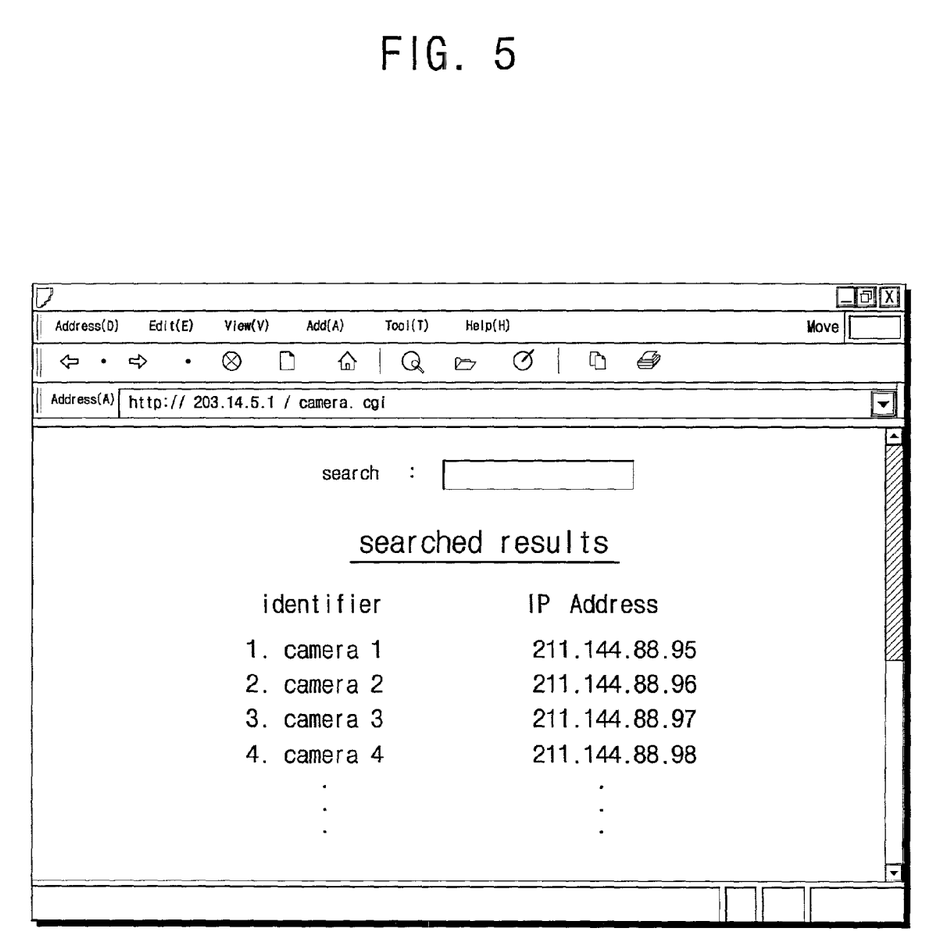
FIG. 5 is a view showing a screen configuration of the network system in accordance with the present invention.

On the other hand, in the above step S100, the user PC 95 may not be able to recognize the Ethernet address or identifier of the Internet video server 50. In this case, the user can access the Internet video server 50 by entering a CGI search keyword (camera.cgi) using the user PC 95, as shown in FIG. 5. Namely, as shown in FIG. 5, the user enters the CGI keyword (camera.cgi) next to the IP address or URL address of the agent server 10 through the user PC 50 in order to search for the variable IP address of the desired network unit or Internet video server 50.

Example: http://IP_server/camera.cgi or http://203.14.5.1/camera.cgi

Then, the control unit 40 in the agent server 10 searches the database 30 for variable IP addresses of network units which match the entered CGI keyword, and outputs a list of the searched variable IP addresses, as shown in FIG. 5, so that the user can gain access to a desired one of the network units.

It should be noted that the Internet video server 50 has been taken as an example of the network unit for the convenience of description. This invention is similarly applicable to computers, routers and other Internet accessible units equipped with LAN cards and having variable IP addresses.

As described above, the database 30 and control unit 40 are provided in the agent server 10 in order to store variable IP addresses and Ethernet addresses, and to search for the variable IP addresses on the basis of the Ethernet addresses. As a result, users are readily able to access desired network units, even if the units employ variable IP addresses.

As is apparent from the above description, the present invention provides a network system, and a method of controlling the same, wherein variable IP addresses of network units can be recognized as fixed IP addresses.

Although the preferred embodiments of the present invention have been disclosed for illustrative purposes, those skilled in the art will appreciate that various modifications, additions and substitutions are possible without departing from the scope and spirit of the invention as recited in the accompanying claims.

What is claimed is:

1. A network system, comprising:
   at least one network unit having a variable Internet protocol (IP) address and unique identification information;
   a dynamic host configuration protocol (DHCP) server responsive to a request from said at least one network unit for assigning said variable IP address to said at least one network unit for a predetermined period of time; and
   an agent server comprising:
      a communication unit for receiving said unique identification information and said variable IP address from said at least one network unit, for transferring said unique identification information and said variable IP address, and for receiving from a user unique identification information of a network unit selected by the user;
      a database connected to said communication unit for receiving and storing said variable IP address and said unique identification information transferred from said communication unit; and
      a control unit connected to said communication unit and to said database for receiving from the user via said communication unit said unique identification information of said network unit selected by the user, for searching said database for said variable IP address of said at least one network unit on the basis of the unique identification information received from the user, and for enabling the user to gain access to said selected network unit in accordance with results of the searching of said database, wherein said unique identification information received from the user comprises at least one of an Ethernet address of said at least one network unit and a search keyword for said variable IP address of said at least one network unit, wherein the Ethernet address comprises an address which corresponds to and is not the same as said unique identification information received from said at least one network unit, and wherein the search keyword comprises a keyword which corresponds to and is not the same as said unique identification information received from said at least one network unit.

2. The network system as set forth in claim 1, wherein said control unit receives said at least one of said Ethernet address of said at least one network unit and said search keyword for said variable IP address of said at least one network unit from the user over said network and via said communication unit, compares said at least one of said Ethernet address of said at least one network unit and said search keyword for said variable IP address of said at least one network unit with data stored in said database to produce a match, and searches for said variable IP address when the match is produced.

3. The network system as set forth in claim 2, wherein said data stored in said database is updated at regular time intervals.

4. The network system as set forth in claim 1, wherein the search keyword which corresponds to and is not the same as said unique identification information received from said at least one network unit is a common gateway interface (CGI) search keyword.

5. The network system as set forth in claim 1, wherein said unique identification information of said network unit selected by the user comprises an IP address of said agent server and a search keyword corresponding to the at least one network unit.

6. A method of controlling a network system having a dynamic host configuration protocol (DHCP) server, an agent server, and at least one network unit, said method comprising the steps of:
(a) requesting a variable Internet protocol (IP) address for said at least one network unit from said DHCP server when said at least one network unit powers up;
(b) transmitting the requested variable IP address from said DHCP server to said at least one network unit;
(c) storing unique identification information and the variable IP address of said at least one network unit in a database in said agent server;
(d) receiving data at said agent server from a user over a network, comparing said received data with said unique identification information stored in said database, and searching for said variable IP address of said at least one network unit when said comparing produces a match; and
(e) connecting the user to said at least one network unit having the searched variable IP address;

wherein said method further comprises the steps, between steps (b) and (c), of receiving said unique identification information and said variable IP address of said at least one network unit at said agent server, and transferring said unique identification information and said variable IP address of said at least one network unit to said database in said agent server, and wherein said received data from the user comprises at least one of an Ethernet address of said at least one network unit and a search keyword for said variable IP address of said at least one network unit, wherein the Ethernet address comprises an address which corresponds to and is not the same as said unique identification information received from said at least one network unit, and wherein the search keyword comprises a keyword which corresponds to and is not the same as said unique identification information received from said at least one network unit.

7. The method as set forth in claim 6, wherein data stored in said database is updated at regular time intervals.

8. The method as set forth in claim 6, wherein data stored in said database is updated at regular time intervals.

9. The method as set forth in claim 6, wherein the search keyword which corresponds to and is not the same as said unique identification information received from said at least one network unit is a common gateway interface (CGI) search keyword.

10. The method as set forth in claim 6, wherein said received data from the user comprises an IP address of said agent server and a search keyword corresponding to the at least one network unit.

11. A network system comprising a dynamic host configuration protocol (DHCP) server, an agent server, and at least one network unit having a variable Internet protocol (IP) address assigned to said at least one network unit by said DHCP server, and unique identification information, said agent server comprising:
a communication unit for receiving, from each said at least one network unit, said variable IP address assigned to said at least one network unit by said DHCP server and said unique identification for each said at least one network unit, and for receiving from a user unique identification information for a network unit selected by the user;
storing means connected to said communication unit for receiving and storing said variable IP address and said unique identification information for each said at least one network unit; and
a control unit connected to said communication unit and to said storing means for receiving the unique identification information for the network unit selected by the user, and for searching said storing means for said variable IP address of said selected network unit on the basis of the unique identification information received from the user, and responsive to results produced by said searching for enabling the user to gain access to said selected network unit;

wherein said storing means comprises a database, said communication unit transferring said received unique identification information and said variable IP address to said database; and wherein the unique identification information received from the user includes at least one of an Ethernet address of said at least one network unit and a search keyword for said variable IP address of said at least one network unit, wherein the Ethernet address comprises an address which corresponds to and is not the same as said unique identification information received from said at least one network unit, and wherein the search keyword comprises a keyword which corresponds to and is not the same as said unique identification information received from said at least one network unit.

12. The network system as set forth in claim 11, wherein said control unit receives, from the user, the at least one of an Ethernet address and a search keyword corresponding to the network unit selected by the user.

13. The network system as set forth in claim 11, wherein the search keyword which corresponds to and is not the same as said unique identification information received from said at least one network unit is a common gateway interface (CGI) search keyword.

14. The network system as set forth in claim 11, wherein said unique identification information of said network unit selected by the user comprises an IP address of the agent server and a search keyword corresponding to the at least one network unit.

15. A method of controlling a network system having a dynamic host configuration protocol (DHCP) server, an agent server, and at least one network unit, said method comprising the steps of:

(a) requesting a variable Internet protocol (IP) address for said at least one network unit from said DHCP server when said at least one network unit powers up;

(b) transmitting the requested variable IP address from said DHCP server to said at least one network unit;

(c) storing unique identification information and the variable IP address of each said at least one network unit in a database in said agent server;

(d) receiving at said agent server, from a user, unique identification information corresponding to a network unit selected by the user;

(e) comparing said unique identification information received from the user with said unique identification information stored in said database;

(f) determining said variable IP address of said network unit selected by the user when step (e) produces a match; and (g) connecting the user to said selected network unit having the determined variable IP address;

wherein said unique identification information received from the user comprises at least one of an Ethernet address of said at least one network unit and a search keyword for said variable IP address of said at least one network unit, wherein the Ethernet address comprises an address which corresponds to and is not the same as said unique identification information received from said at least one network unit, and wherein the search keyword comprises a keyword which corresponds to and is not the same as said unique identification information received from said at least one network unit.

16. The method as set forth in claim 15, wherein the unique identification information received from the user comprises the at least one of an Ethernet address and a search keyword corresponding to the network unit selected by the user.

17. The method as set forth in claim 16, wherein said data stored in said database is updated at regular time intervals.

* * * * *